United States Patent
Murphree et al.

[11] 3,943,482
[45] Mar. 9, 1976

[54] MARINE MINE DETECTOR

[75] Inventors: Francis J. Murphree, Sunnyside; Henry L. Warner; Edward G. McLeroy, Jr., both of Panama City, all of Fla.

[73] Assignee: The United States of America as represented by the Secretary of the Navy, Washington, D.C.

[22] Filed: Oct. 3, 1967

[21] Appl. No.: 673,254

[52] U.S. Cl. .............................. 340/3 R
[51] Int. Cl.² .......................... G01S 9/68
[58] Field of Search ............ 340/1, 3; 343/13, 17.1, 343/17.5

[56] References Cited
UNITED STATES PATENTS

| | | | |
|---|---|---|---|
| 2,817,832 | 12/1957 | Mathes | 343/13 |
| 2,994,060 | 7/1961 | Ross | 340/3 |
| 3,212,053 | 10/1965 | Finney | 340/3 |
| 3,307,142 | 2/1967 | Doebler | 340/3 |

Primary Examiner—Richard A. Farley
Attorney, Agent, or Firm—Richard S. Sciascia; Louis A. Miller; Don D. Doty

[57] ABSTRACT

A sonar system for detecting and identifying objects laying on or submerged in a sea floor having a dual frequency transmitter and a dual frequency receiver for timely broadcasting and receiving a pair of relatively high and low frequency acoustical signals, respectively, in accordance with a predetermined timing program which facilitates the display and interpretation thereof.

10 Claims, 4 Drawing Figures

Francis J. Murphree
Henry L. Warner
Edward G. McLeroy
INVENTORS

Francis J. Murphree
Henry L. Warner
Edward G. McLeroy
INVENTORS

BY

Dox D. Doty
ATTORNEY

Francis J. Murphree
Henry L. Warner
Edward G. McLeroy
INVENTORS

MARINE MINE DETECTOR

The invention described herein may be manufactured and used by or for the Government of the United States of America for governmental purposes without the payment of any royalties thereon or therefor.

The present invention relates generally to echo-search-ranging systems and, in particular, is an improved sonar system for detecting, identifying, and measuring the range to objects such as, for example, marine mines laying on the sea floor or buried in the sand or mud thereof.

In the past, echo-search-ranging sonar systems have been employed to find and identify marine mines and mine-like objects laying on or partially or fully buried in the ocean floor. And although they have been satisfactory for numerous purposes, up to the present time, they still leave something to be desired, especially from the search rate, detection capability, and identification standpoints.

One such prior art sonar system is that which is disclosed in patent application Ser. No. 600,701, entitled Sonar System, filed Dec. 8, 1966, by inventors Francis J. Murphree, Henry L. Warner, and Edward G. McLeroy. To a certain extent the principles of operation inherently contained therein are somewhat comparable to those of the subject invention; however, the two systems are obviously distinguishable from each other, in that the former is far more complex than the latter from a structural standpoint, and, of course, their respective embodiments contain different structural elements, which are interconnected in such manner as to effect different combinations of elements. Hence, new and improved results are obtained from the subject invention with a relatively simplified system.

It is, therefore, an object of this invention to provide an improved, simplified method and means for detecting, identifying, and measuring the range to sea mines and mine-like target objects suspended within the sea, laying on the sea floor, or buried or partially buried in the sea floor, be it composed of sand or mud or both.

Another object of this invention is to provide an improved echo-search-ranging system.

Still another object of this invention is to provide an improved sonar system for expeditiously locating and identifying objects within a subaqueous medium, such as water or the like.

A further object of this invention is to provide a sonar system which has improved echo-to-reverberation characteristics, improved signal-to-noise ratios, and increased area search rates.

Other objects and many of the attendant advantages will be readily appreciated as the subject invention becomes better understood by reference to the following detailed description, when considered in conjunction with the accompanying drawings wherein.

Figure 1:
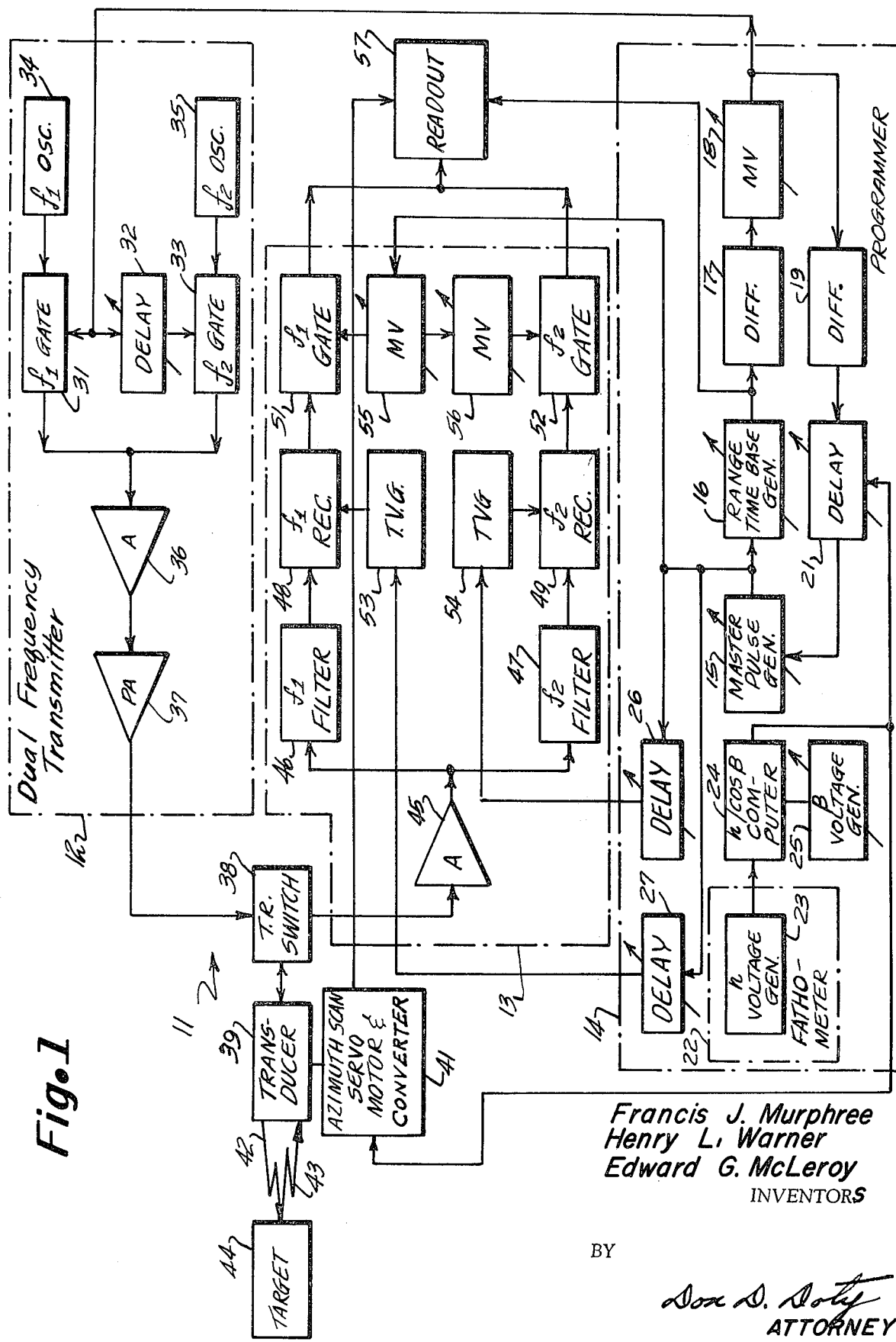
FIG. 1 is a functional block diagram of the system constituting this invention.

Referring now to FIG. 1, there is shown a functional block diagram of the overall system 11 constituting this invention as having a dual frequency transmitter 12, a dual frequency receiver 13, and a programmer 14 associated therewith for the timely actuation of both thereof, in order to effect braodcast, reception, and readout of suitable mine hunting signals.

To facilitate better understanding of said system 11, the components thereof will now be discussed, insofar as it is convenient and logical to do so, in their approximate order of operation, although the operation of the entire invention will be discussed in detail subsequently.

A variable master pulse generator 15 is located in programmer circuit 14 and acts as the master timer or clock, as the case may be. Although it may be a free-running multivibrator if so desired and thus constituted the aforementioned clock, in this particular preferred embodiment it will be considered as being a one-shot multivibrator, the enabling of which will be timely effected by a suitable trigger input signal. Of course, master pulse generator 15 is variable, so that its enabled time period may be regulated manually by a human operator or automatically by any other type of operator warranted under the circumstances.

The output of master pulse generator 15 is coupled to the input of a range time base generator 16, the output of which is connected through a differentiator 17 to the input of a variable single-shot multivibrator 18. The output thereof is coupled to the input of another differentiator 19, and the output of differentiator 19 is connected through a variable delay line 21 to the trigger input of the aforementioned master pulse generator 15.

Delay 21 is, as previously mentioned, capable of being varied. In this particular arrangement, it is capable of being varied both automatically by an input signal and manually.

Programmer 14 also includes a Fathometer 22, which is preferably located in the aforesaid submarine vehicle in such manner as to measure — and when appropriately designed — control the height above the sea floor at which said vehicle travels. One of the functions thereof that is pertinent to this invention is the production of a signal voltage by an $h$ voltage generator 23 that is proportional to height $h$ at which the vehicle is running at any given instant. The output thereof supplying such voltage is coupled to one of the inputs of a computer 24 which computes in accordance with the expression $h/\cos \beta$. To do so, it, of course, has another input which receives a voltage representing an angle $\beta$, and this voltage is supplied thereto because a $\beta$ voltage generator 25 has its output connected to the input thereof. $\beta$, as will be discussed more fully below, is defined as the angle between the vertical height of the vehicle from the sea floor and the slant-range at which the echo-search signal is being transmitted. The output of said $h/\cos \beta$ computer 24 is connected to the control input of delay line 21, so as to regulate the amounted of delay effected thereby as a function of the altitude h at which the submarine vehicle is traveling.

The output of master pulse generator 15 is also connected to the respective inputs of variable delay lines 26 and 27, the outputs of which, along with the output of master pulse generator 15, are connected to appropriate inputs of dual frequency receiver 13.

Of course, it may readily be seen from FIG. 1 that components 15 through 27 are interconnected in such manner as to form programmer 14.

One of the outputs of programmer 14 is taken from the output of multivibrator 18, and, hence, it is connected to the control input of an $f_1$ gate 31 and the input of a delay line 32. The output of delay line 32 is coupled to the input of an $f_2$ gate 33. The other inputs of gates 31 and 33 are connected to the outputs of a pair of oscillators 34 and 35, respectively, with the frequency ($f_1$) of the former being somewhat higher than that ($f_2$) of the latter, and preferably of the order of two or three times higher.

The outputs of gates 31 and 33 are interconnected and connected through an amplifier 36 and a power amplifier 37 connected in series therewith to the input of a transmit-receive switch 38, the latter of which blocks the transmitted signal from receiver 13 during the transmit portion of the operational cycle but allows the received signal to pass thereto during the reception portion of the operational cycle.

All of the aforementioned components 31 through 37 constitute the dual frequency transmitter section of the invention.

Transmit-receive switch 38 has its combination output-input terminals connected to a reversible electroacoustical transducer 39 which is adapted for broadcasting acoustical energy within its ambient medium in response to a proportional electrical signal and produce an electrical signal in response to a received acoustical signal. It would, of course, be possible to use separate transmitting and receiving transducers, if desired, or if it would be advantageous to transmit a beam that is wider than the received beam.

An azimuth scan servo motor and converter 41 is connected to transducer 39 in such manner as to cause it to rotate in a controlled scanning manner and at the same time generate an output signal that is representative of its position at any given instant. For effecting such operations, it may include a suitable motor, a servo, a position sensor, and a voltage generator, although none of these items have been depicted, in the drawing in order to provide simplicity of disclosure, and because they are well known and conventional in the art per se, as well as in such combination.

Optionally, the output of $h/\cos \beta$ computer 24 may also be connected to the servo input of azimuth scan servo motor and converter 41 in such manner that as the value of $h$ increases, the rate of transducer scan is decreased.

When the invention is operating in the broadcast mode, an acoustical search signal 42 is transmitted and is reflected as an echo signal 43 from a target 44, in the event one is present. In the receive mode, echo 43 is received by transducer 39, which, of course, is likewise connected to the receive input of transmit-receive switch 38.

The output of transmit-receive switch 38 is connected to the input of dual frequency receiver 13 and, in particular, to the input of an amplifier 45 incorporated therein.

The output of amplifier 45 is connected to the inputs of a pair of filters 46 and 47, which are capable of passing only $f_1$ and $f_2$ frequencies, respectively. The outputs of filters 46 and 47 are respectively connected to the inputs of $f_1$ and $f_2$ receivers 48 and 49, the outputs of which are respectively connected to the inputs of $f_1$ and $f_2$ gates 51 and 52.

The outputs of delay lines 26 and 27 of the aforesaid programmer 14 are connected to the inputs of a pair of time-varied-gain amplifiers 53 and 54, respectively, and the outputs of said time-varied-gain amplifiers 53 and 54 are connected to the respective gain control inputs of said receivers 48 and 49. Although time-varied-gain amplifiers 53 and 54 may have any desired gain functions, in this particular case, they should provide gains that are increased with the target search range being used at any given time, thereby causing the output signals from receivers 48 and 49 to be substantially similar in amplitude and, thus, not be attenuated due to the occurrence of signal travel losses within the operational environmental medium.

A first adjustable monostable multivibrator 55 has its input connected to the output of the aforesaid master pulse generator 15 of programmer 14. One of its outputs is coupled to the control input of $f_1$ gate 51, and the other output thereof is coupled to the input of a second adjustable monostable multivibrator 56, the output of which is connected to the control input of $f_2$ gate 52.

The outputs of gates 51 and 52 constitute the outputs of dual frequency receiver 13. They are, in this particular embodiment, interconnected and connected to the intensity input of a suitable readout 57.

As previously implied, the sweep input of readout 57 is coupled to the output of master pulse generator 15, and the remaining input thereof is connected to the output of the aforesaid azimuth converter in such manner that the physical scan position of transducer 39 is correlated with the horizontal sweep of readout 57.

At this time, it should be understood that any suitable device may be used as readout 57. It may be an oscilloscope, an indicator, a recorder, an oscillograph, or the like.

Also, at this time, it should be understood that all of the individual elements and components of the system of FIG. 1 are well known and conventional per se. Hence, it is their interconnections and interactions which combine to constitute the unique invention disclosed herewith and produce the new and/or improved results produced thereby.

Figure 2:
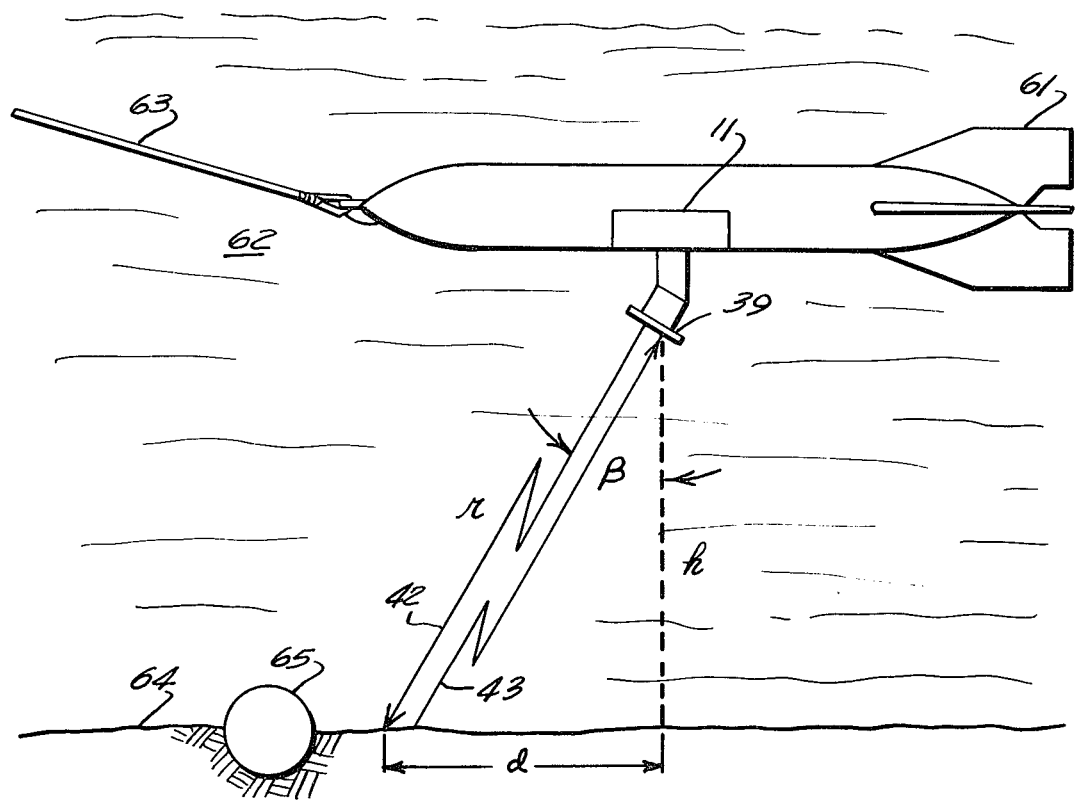
FIG. 2 is a quasi-pictorial elevational view of the subject invention operating in an aqueous medium for the purpose of hunting submarine mines.

FIG. 2 shows an exemplary stabilized platform as being a submarine vehicle 61 which is towed by a ship or other tractor means (not shown) within sea water 62 by means of a combination tow and electrical cable 63. As previously suggested, the system constituting this invention may be mounted entirely within vehicle 61, it may be partially mounted within vehicle 61 with, say, readout 57 located in the tractor vehicle, or it may all be located in the tractor vehicle, with the exception of the transducer. In any event, transducer 39 is slanted at an angle $\beta$ with the vertical and, therefore, search signal 42 strikes sea floor 64 somewhat ahead of the tractor vehicle. If a mine 65 is present, echo signal 43 is a reflection therefrom; but, of course, if no mine is present only the sea floor or other spurious reflections are included in echo 43.

It has ben ascertained that a vehicle height ($h$) of approxomately 20 feet above the sea floor is satisfactory, and when this height is used, the search signal range ($r$) is of the order of 28 feet, and the horizontal distance ($d$) becomes about 14 feet.

Figure 3:
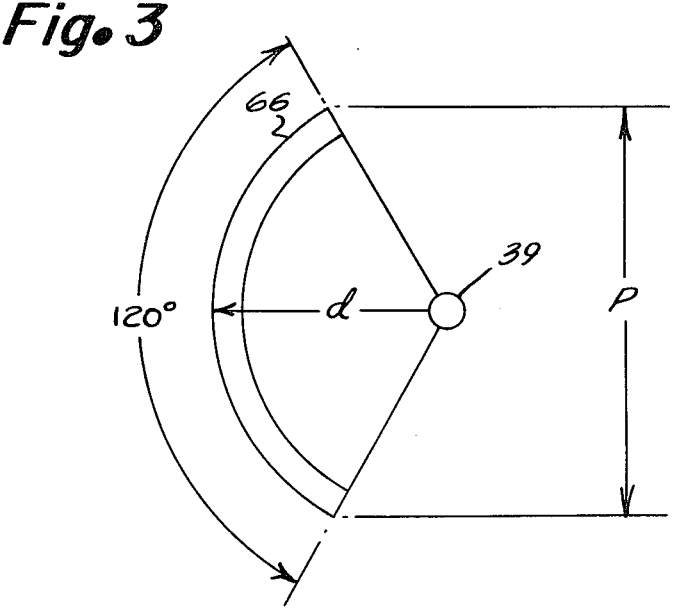
FIG. 3 is an exemplary search-scan diagram which may be employed during the operation of the subject invention.

Transducer 39 is herewith disclosed as being a single transducer that is rotated back and forth at some given speed and scan angle — in this particular instance, a 120° scan angle. However, if desired, transducer 39 may be replaced by an array of movable or fixed transducers which produces any search pattern warranted by the operational circumstances. In either case, FIG. 3 illustrates a transducer scan pattern 66 that is considered to be optimum for most mine hunting conditions. Because FIG. 3 is a top view, distance d represents the horizontal distance from the transducer to the sea floor scan pattern. With d equaling approximately 14 feet and the scan angle being about 120°, the searched path width is of the order of 25 feet.

The operation of the invention will now be discussed briefly in conjunction with all of the figures of the drawing.

As may be readily understood, the system constituting this invention is mounted in or used in conjunction with a predetermined stabilized platform. Inasmuch as the preferred embodiment of the invention herewith disclosed is intended to be used as a marine mine hunting system, it is, in fact, a sonar system which is either mounted in or used with a submarine vehicle which is so designed and instrumented as to maintain substantially a constant height above the sea floor. Any one of a known family of such vehicles may be used for this purpose. Since the appropriate selection thereof would be obvious to the artisan having cognizance of the operational conditions involved, no further details with respect thereto are deemed necessary or desirable at this time. However, perhaps at the outset, it should be understood that the subject invention may be used in environmental mediums other than a subaqueous one, and, thus, it is intended to be within the scope of this invention to make those design changes necessary to make it compatible therewith. So doing would, of course, be well within the purview of one skilled in the art having the benefit of the teachings herewith presented.

As depicted in FIG. 2, the entire system 11 is disposed in submarine vehicle 61, which is towed by an appropriate tractor vehicle, such as a submarine boat, ship, aircraft, or the like, by means of tow-cable 63. As vehicle 61 is towed along, transducer 39 transmits acoustical energy 42 toward sea floor 64 and in due time receives an echo back therefrom. If, during its travels, a target object such as, for example, a mine 65 is encountered or acquired by search signal 42, the reflection therefrom is included in echo signal 43 that is received by transducer 39 during the receive mode of operation.

As illustrated in FIG. 3, a conical scan 66 is suitable for the search signal, in that it provides a rather broad search sweep or path, as vehicle 61 moves along and, therefrom, actually expedites the mine hunting operation.

At this point it may be apropos to point out that to improve the echo-to-reverberation ratio from a target, one of several things can be done. For example, the beam-width can be decreased either by increasing the transmitted search signal frequency or by increasing the transducer size. But, unfortunately, as a matter of practicality, transducer size is limited, and it has been demonstrated that signal attenuation in sand, inorganic, or mud bottoms increases with frequency, and this, in turn, would limit the maximum depth at which targets could be detected. Obviously, a detection capability at both great and shallow depths is desirable. One way to accomplish this within the restraints posed by transducer size would be to employ a relatively lower frequency for the detection of targets below a certain depth and a relatively higher frequency for detection of targets at a lesser depth. The low frequency beam pattern would be broader than that of the high frequency pattern; hence, with proper frequency selections, the resultant echo-to-surface reverberation ratio could be made about the same for both cases. This invention accordingly makes use of such principle and consists of means for detecting targets at shallow depths with a high frequency (say, of the order of 110 kilocycles per second) and for detecting targets at great depths with a low frequency (say, of the order of 40 kilocycles per second), so that for a given limitation on transducer-hydrophone array size, an optimum resolution may be obtained.

To accomplish this, search signals of both frequencies are transmitted sequentially (or simultaneously, as advantageous, during any given operational circumstances) in accordance with a predetermined program, and the received echoes thereof are examined for a given time at the higher frequency so that shallow targets will be detected and at a slightly later time at the lower frequency so that targets buried deeper can be detected. This occurs each ping-receive cycle. The total time intervals during which the echo returns are analyzed are equal to the travel time of the sound in the sea bottom plus an additional time interval to allow for the detection of surface targets.

Figure 4:
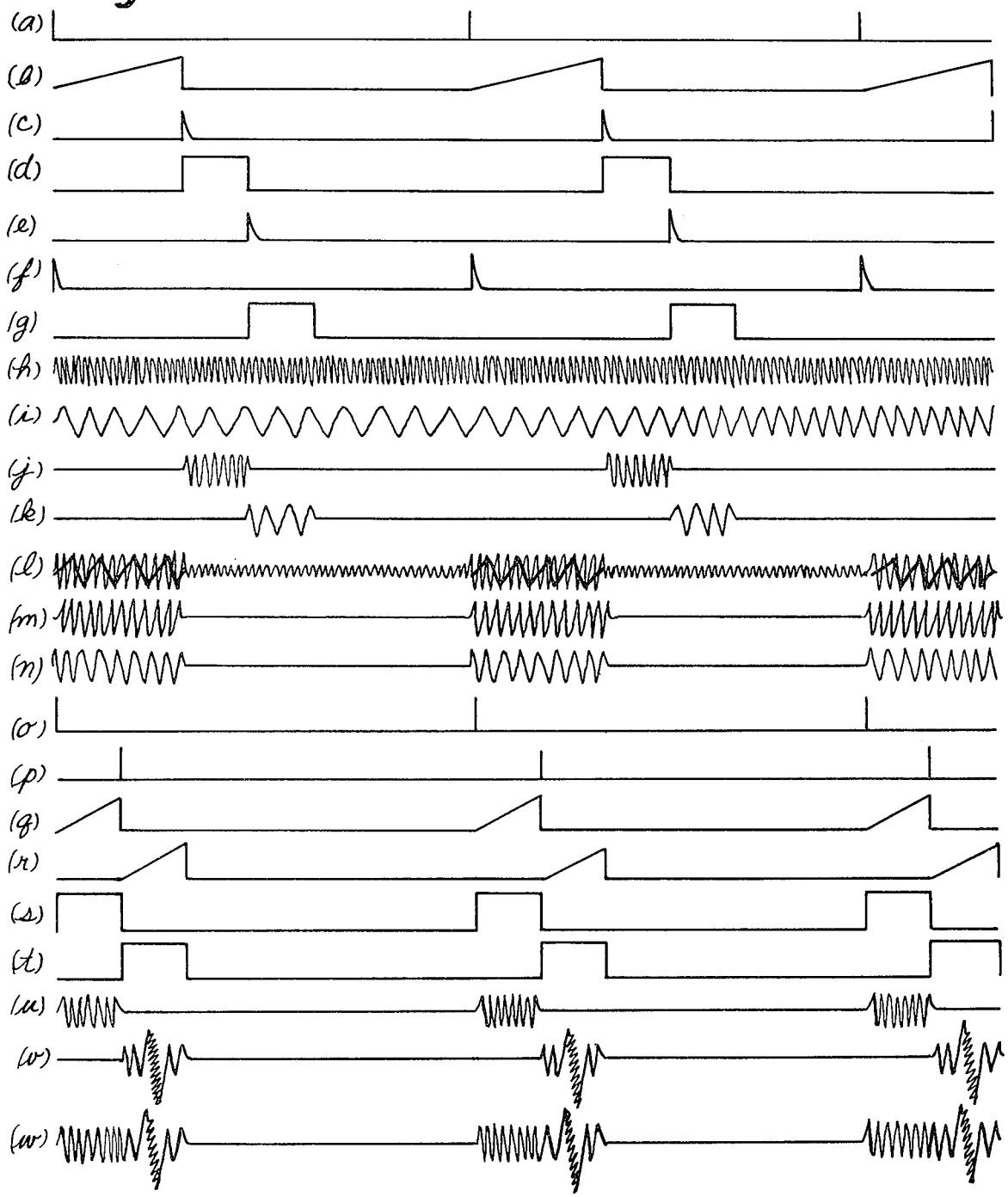
FIG. 4 is an idealized graphical representation of the various signal waveforms which emanate respectively from the various components of the system of FIG. 1.

In conjunction with FIGS. 1 and 4, the foregoing function accomplishments will now be explained in some detail. Master pulse generator 15 produces a pulse similar to that shown in FIG. 4(a). This pulse initiates the generation of a sawtooth signal by range time base generator 16 comparable to that shown in FIG. 4(b), which is then applied to readout 57 as a horizontal sweep voltage therefor and to differentiator 17 so that differentiation of the trailing edge thereof will be effected and, thus, produce the waveform of FIG. 4(c). The pulses of said waveform triggers monostable multivibrator 18 to its unstable state for a preset time period and thereby generates the output signal waveform of FIG. 4(d). The output signal of multivibrator 18 takes two paths. One of said paths is a feedback loop consisting of differentiator 19, wherein the trailing edge is converted to pulses as shown in FIG. 4(e), which, in turn, is delayed an amount of time equal to the search-echo travel time period or greater. FIG. 4(f) depicts said delayed pulse, and it is supplied to the control input of master pulse generator 15 to initiate another output pulse therefrom, which, as will be seen, effectively initiates the transmit mode of the operational cycle.

Fathometer 22 measures the height above the sea floor at which transducer 39 is traveling and generates a voltage h that is proportional thereto by means of h voltage generator 23. Another voltage that is proportional to angle $\beta$, the angle between the vertical height of transducer 39 and its search-echo-signal r, is generated by $\beta$ voltage generator 25. These two voltages are then processed by computer 24 to produce an output therefrom representative of the term $h/\cos \beta$, and this output is supplied to the control input of the aforesaid delay 21 to vary the delay period thereof in accordance therewith. Thus, automatic compensation is provided for all vehicle altitudes and transducer settings.

Delays 26 and 27, which may be adjusted to provide zero to several milliseconds delay, produce delayed master pulse generator pulses similar to those shown in FIGS. 4(o) and (p). They are mentioned at this time because they, as well as elements 15 through 24, are included in programmer 14.

Because programmer 14 produces all of the relevant timing signals which make the remainer of the invention's circuitry work in perfect correlation, it is of paramount importance. One of its outputs controls the timing of the circuits of dual frequency transmitter 12. This output is taken from multivibrator 18 and is supplied to open $f_1$ gate 31 for the time period indicated by the positive square-wave portion of the waveform of FIG. 4(d), and a delayed version thereof, represented by the waveform of FIG. 4(g), is supplied to the control input of $f_2$ gate 33 for the timely opening thereof. When gate 31 is open, the relatively high frequency signal generated by $f_1$ oscillator 34, represented by FIG. 4(h), is passed therethrough and thus effects a gated output therefrom which is substantially similar to that represented by FIG. 4(j). The output of $f_2$ oscillator 35, represented by FIG. 4(k), is timely gated by $f_2$ gate 33 to produce an output signal similar to that represented by FIG. 4(k). These two signals are then amplified to more useful levels by amplifiers 36 and 37, before being passed through TR switch 38 and broadcast by transducer 39.

Of course, as previously mentioned, the broadcast signal is a sonic signal because, in this particular preferred embodiment the operational medium is water or sea water. The echo thereof is received by transducer 39 after it is reflected from the sea floor, a target, and/or other objects or reflectors in the scanned path.

The scanning of the transducer is of some operational significance. It should preferably be slow enough so that the broadcast and received signals are effectively accomplished at the same transducer position. However, it is recognized that there may, in fact, be incremental position differences therebetween; but such differences do not produce any adverse effects, for all practical purposes, if the scan rate selected is within the acceptable maximum for any given operational circumstances, inasmuch as inaccuracies produced as a result thereof are so small as to be negligible.

Furthermore, since the total travel time of the search-echo signal becomes less as the distance h between the transducer and the sea floor is decreased, it also becomes possible to increase the transducer scan rate in proportion thereto. Therefore, as previously suggested, if so desired, the output from computer 24 may be used to control the transducer scan rate to make it inversely proportional to height h. Hence, the output of computer 24 may be appropriately connected to an inverse scan rate control servo of azimuth scan servo motor and converter 41 for such purpose.

During the broadcast mode, TR switch 38 blocks the two aforementioned signals and prevents them from entering dual frequency receiver 13, but during the receiver mode, it allows the received signals to pass to amplifier 45, where they are amplified to a more useful level. As may be seen from FIG. 4(l), the received signal is a somewhat lengthened composite of the FIG. 4(j) and (k) broadcast signals and may, in addition contain other spurious signals, acquired during its subaqueous travel. Thus, it is somewhat changed or polluted, as it arrives at dual-frequency receiver 13. But they are refined and separated by filters 46 and 47, which, of course, pass only the useful $f_1$ and $f_2$ frequencies, respectively. They are further refined, processed, shaped, and amplified by receivers 48 and 49, respectively so as to become waveforms substantially similar to those shown in FIGS. 4(m) and (n), before being timely gated by $f_1$ and $f_2$ gates 51 and 52. As mentioned above, however, a further processing is effected by time-varied-gain circuits 53 and 54, which optimize the usefulness of the received signals because they are amplified thereby in such manner as to make the longer range signals (which are ordinarily attenuated most) have amplitudes that are approximately equal during a no-target situation. The proper timing thereof is effected by the delayed master pulse generator signals typically represented by the waveforms of FIGS. 4(o) and (p), and the time-varied-gain operations for both receivers 48 and 49 are timely effected by the typical signal waveforms represented by FIGS. 4(q) and (r), respectively.

The output pulses of master pulse generator 15 also triggers multivibrator 55 to an unstable state for the predetermined time periods represented by the positive square-wave portions of the waveform of FIG. 4(s), and this is the signal that is supplied to the control element of gate 51 for the timely opening and closing thereof. The trailing edge of the squarewave of FIG. 4(s), in turn, triggers multivibrator 56 to generate the waveform of FIG. 4(t), which is applied to $f_2$ gate for the timely opening and closing thereof. Hence, the signals of FIGS. 4(u) and (v) are gated into readout 57 for the recording and/or display thereof either separately (as illustrated in FIG. 4(u) and (v)) or as a continuous signal, depending on the readout device employed. Assuming that the continuous signal readout device is used, the display thereof would appear somewhat like the waveform of FIG. 4(w).

As may be seen from either FIG. 4(v) or FIG. 4(w), if a target has been acquired, the amplitude of one frequency or the other will be increased sufficiently to form a blip somewhere therein to indicate it. In this disclosure, targets are shown to have been acquired by the lower frequency search signal, which, of course, indicates that the target is located at a considerable distance from the search vehicle and is perhaps buried or partially buried in the sea floor.

From the foregoing it may readily be seen that the subject invention constitutes a relatively simplified embodiment of a high fidelity sonar system which facilitates the hunting, finding, and identifying target objects, such as marine mines laying on or buried in the sea floor. Of course, it is obvious that it could be applied advantageously to many other uses, as well.

Obviously, other embodiments and modifications of the subject invention will readily come to the mind of one skilled in the art having the benefit of the teachings presented in the foregoing description and the drawing(s). It is, therefore, to be understood that this invention is not to be limited thereto and that said modifications and embodiments are intended to be included within the scope of the appended claims.

What is claimed is:

1. An echo-search system, comprising in combination:
   means for broadcasting a predetermined plurality of target search signals, each of which has a frequency different from that of the others;
   means for timely receiving said plurality of target search signals after they have been reflected from a target;
   means connected to said receiving means for separating said received plurality of target search signals into the component signals thereof according to their individual broadcast frequencies;

means effectively coupled to the output of said received signal separating means for successively gating the individual frequency component signals thereof;

programmer means connected to said broadcasting means and to the aforesaid gating means for effecting the broadcast of said target search signals and the gating of the aforesaid received individual frequency component signals thereof, respectively, in accordance with a predetermined program, said programmer means including a variable master pulse generator, with the output thereof effectively connected to the inputs of said gating means; a range time base generator connected to the output of said variable master pulse generator; a first differentiator connected to the output of said range time base generator; a variable monostable multivibrator having an input and an output, with the input thereof connected to the output of said first differentiator, and with the output thereof effectively connected to an input of said broadcasting means for timely initiating the broadcast of said predetermined plurality of target search signals; a second differentiator coupled to the output of said variable monostable multivibrator; and a variable delay line having a pair of inputs and an output, with one of the inputs thereof adapted for regulating the delay period thereof in response to a predetermined signal, with the other input thereof connected to the output of said second differentiator, and with the output thereof connected to the trigger input of the aforesaid variable master pulse generator; and means coupled to the outputs of said gating means for reading out the successively gated individual frequency component signals therefrom.

2. The invention according to claim 1 further characterized by a vehicle means, adapted for traveling a predetermined distance from a predetermined reference, for housing the aforesaid echo-search system.

3. A sonar system comprising in combination:
a transducer for broadcasting acoustical energy within a subaqueous medium in response to an electrical signal and for producing an electrical signal in response to an acoustical signal received from within said subaqueous medium;
a first oscillator for generating a first electrical signal having a predetermined frequency;
a second oscillator for generating a second electrical signal having a lower frequency than that of said first electrical signal;
means effectively connected between the outputs of said first and second oscillators and the input of said transducer for timely gating said first and second electrical signals thereto;
means effectively connected to the output of said transducer for only passing a third signal having a frequency that is the same as the frequency of said first electrical signal;
means effectively connected to the output of said transducer for only passing a fourth signal having a frequency that is the same as the frequency of said second electrical signal;
a readout means;
means effectively connected between the outputs of said third and fourth signal passing means and the input of said readout means for timely and respectively gating the aforesaid passed third and fourth frequency signals thereto;
a variable master pulse generator, with the output thereof effectively connected to the control inputs of said third and fourth signal gating means;
a variable range time base generator connected to the output of said variable master pulse generator;
a first differentiator connected to the output of said variable range time base generator;
a variable monostable multivibrator having an input and an output, with the input thereof connected to the output of said first differentiator, and with the output thereof effectively connected to the control inputs of said first and second electrical signal gating means;
a second differentiator coupled to the output of said variable monostable multivibrator; and
a variable delay line having a pair of inputs and an output, one input of which is an input for regulating the delay period thereof in response to a predetermined signal, the other input of which is coupled to the output of said second differentiator, and the output of which is connected to the trigger input of the aforesaid variable master pulse generator.

4. The invention according to claim 3 further characterized by a transmit-receive switch effectively connected between the outputs of said first and second electrical signal gating means, the input-output of said transducer, and the inputs of said first and second frequency signal passing means.

5. The invention according to claim 3 further characterized by an azimuth converter means connected between said transducer and the aforesaid readout means for moving said transducer in a predetermined scanning manner and synchronizing said readout means therewith.

6. The invention according to claim 3 further characterized by a pair of receivers respectively connected between the outputs of said third and fourth signal passing means and the inputs of said third and fourth signal gating means.

7. The invention according to claim 6 further characterized by means respectively connected to said pair of receivers for timely regulating the gain thereof in accordance with a predetermined program.

8. The invention according to claim 3 further characterized by:
a depth sounder having a first voltage generator incorporated therein which produces a first voltage that is proportional to the altitude h at which the aforesaid transducer is disposed above the floor of the subaqueous medium within which it is broadcasting acoustical energy;
a second voltage generator for producing a second voltage that is proportional to the angle between said transducer altitude and the direction of energy broadcast thereof;
means, having a pair of inputs and an output, for computing the expression $h \cos \beta$ and for producing an analog voltage at the output thereof that is proportional thereto, with one of the inputs thereof connected to the output of said first voltage generator, with the other input thereof connected to the output of said second voltage generator, and with the output thereof connected to the delay period regulating input of the aforesaid variable delay line.

9. The invention according to claim 3 further characterized by a pair of variable delay lines connected to the output of the aforesaid master pulse generator.

10. The invention according to claim 3 further characterized by:

a first variable monostable multivibrator having an input and a pair of outputs, with the input thereof connected to the output of said variable master pulse generator, and with one of the outputs thereof connected to the control input of the aforesaid first frequency signal gating means; and a second variable monostable multivibrator having an input and an output, with the input thereof connected to the other output of said first variable monostable multivibrator, and with the output thereof connected to the control input of the aforesaid second frequency signal gating means.

* * * * *